United States Patent
Bristow

[11] 3,736,649
[45] June 5, 1973

[54] METHOD OF MAKING CERAMIC-TO-METAL SEAL

[75] Inventor: Robert H. Bristow, Ballston Lake, N.Y.

[73] Assignee: General Electric Company, Owensboro, Ky.

[22] Filed: Aug. 2, 1972

[21] Appl. No.: 277,262

Related U.S. Application Data

[62] Division of Ser. No. 130,265, April 1, 1971, Pat. No. 3,700,420.

[52] U.S. Cl. .................................. 29/473.1, 29/504
[51] Int. Cl. .................................................. B23k 31/02
[58] Field of Search ............... 29/473.1, 504, 195 M, 29/195 G; 287/189, 365; 75/134 M, 173 C

[56] References Cited

UNITED STATES PATENTS

| 2,084,928 | 6/1937 | Turner | 75/173 C |
| 2,138,638 | 11/1938 | Leach | 75/173 C |
| 2,729,558 | 1/1956 | Bayes | 75/134 M |
| 2,728,425 | 12/1955 | Day | 29/473.1 X |
| 3,197,290 | 7/1965 | Williams | 29/195 |
| 3,226,822 | 1/1966 | Budde et al. | 29/195 X |
| 3,693,246 | 9/1972 | Novikov et al. | 29/504 |

OTHER PUBLICATIONS

Semi-Alloys Technical Bulletin No. BA-65, "Brazing Alloys,"

Primary Examiner—J. Spencer Overholser
Assistant Examiner—Ronald J. Shore
Attorney—John P. Taylor, Nathan J. Cornfeld, Frank L. Neuhauser

[57] ABSTRACT

A ceramic-to-metal seal is described which comprises a silver-manganese-copper alloy. Metal may be sealed to ceramic in a one step process without prior metallizing of the ceramic. The alloy melts at temperatures which are sufficiently below the melting point of silver to enable one to seal silver-plated metal parts to ceramic without melting the silver plating.

3 Claims, 1 Drawing Figure

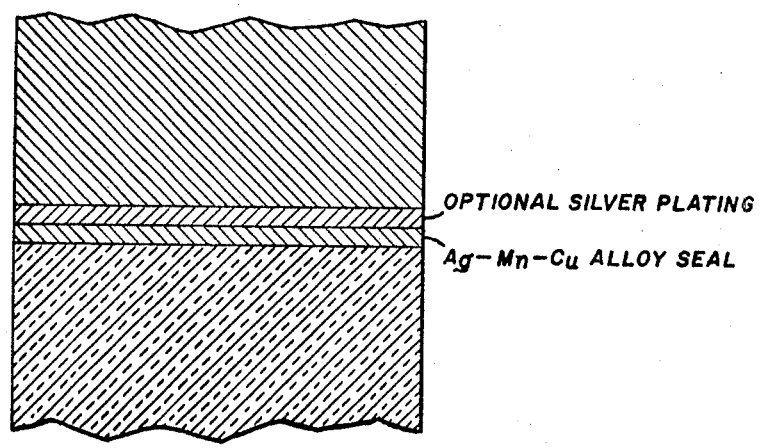

METHOD OF MAKING CERAMIC-TO-METAL SEAL

This application is a divisional application of application Ser. No. 130,265 filed Apr. 1, 1971, now U.S. Pat. No. 3,700,420.

BACKGROUND OF THE INVENTION

The sealing of metal to ceramic to provide, for example, a gas-tight seal such as is required in electron discharge devices and which can be used at high temperatures is known. One known method is to metallize the ceramic surface to be joined to another ceramic or to a metal. After metallizing, the part is joined to the second part using common brazing alloys. However, this requires two steps.

One step sealing methods have also been proposed based on the use of the active metals titanium or zirconium or the hydrides of these metals to promote wetting of the surface of the ceramic by the molten brazing alloy. The active metal is either applied to the surfaces of the ceramic, admixed with the brazing alloy in powder form, or provided as a core or cladding for a brazing alloy. However, the alloys which are formed while making such seals are often very hard and brittle because of the presence of the titanium or zirconium in the alloy. This in turn requires that the sealing metal more closely match the ceramic in thermal expansion than would be required if the alloy possessed greater ductility. It is also necessary to effect such seals in an atmosphere which is almost completely devoid of oxygen due to the extreme reactivity of the active metals titanium or zirconium. Although this can be accomplished by effecting the seals in vacuum, the resulting cost is generally high due to the need for large, expensive vacuum furnaces and the low production rate of such batch-type operations. Furthermore, the evaporation rate of commonly used silver-containing brazing alloys is objectionably high under the high vacuum conditions which are required and can lead to the formation of surface films which cause electrical leakage across insulating surfaces.

It is therefore an object of this invention to provide a low cost, one step, seal for ceramic-to-metal seals. It is a further object of the invention to provide a seal which can be formed under non-oxidizing, yet not necessarily vacuum conditions. It is yet another object of the invention to provide a seal formed of a brazing alloy which will wet the surface of the ceramic without using titanium or zirconium. Further objects of the invention will be apparent from the description.

BRIEF DESCRIPTION OF THE DRAWINGS

The sole FIGURE is a diagrammatic illustration of the seal of the invention.

DESCRIPTION OF THE PREFERRED EMBODIMENT

In accordance with the invention, a ceramic-to-metal gas-tight seal comprises a ceramic surface and a metal surface and an alloy therebetween consisting essentially of silver, manganese, and copper. The seal is formed in a non-oxidizing atmosphere, preferably in a hydrogen atmosphere which is nearly free of oxygen and water vapor and defined as a superdry hydrogen atmosphere.

Many types of metallic and ceramic materials may be sealed together in the manner disclosed but they must be mechanically and chemically stable in the sealing atmosphere at the required sealing temperature. In addition, the metal and the ceramic should have similar coefficients of thermal expansion so as to minimize residual stress in the seal.

Examples of ceramics which may be used include alumina, forsterite, spinel, mullite and steatite.

Examples of metals which have been sealed to ceramics in accordance with the invention include nickel, nickel-iron alloys and alloys of nickel-cobalt-iron. The seal has been found to be particularly effective and useful when, for example, silver plated metals must be joined to ceramic.

While the exact portions of the silver-manganese-copper alloy are not critical, it has been found that a range of about 35–55 weight percent silver, about 10–25 weight percent manganese, and about 25–45 weight percent copper is particularly an effective range. Within this range the ratio of 46 parts silver, 18 parts manganese, and 36 parts copper have been found to be particularly satisfactory since the temperature range between solidus and liquidus is small, that is, the composition appears to be of near-eutectic proportions.

An alloy having this composition was found to be sufficiently ductile that it could be rolled into foil and drawn into wire. This could be a particular advantage if it is desired to fabricate the alloy into foil washers or shims to be placed between the ceramic and metal surfaces to be sealed together.

Alloys with higher manganese contents promote higher bond strengths on some ceramic materials but it may be necessary to increase the sealing temperature to promote better flow. Generally, the sealing temperature should be about 10° to 50°C higher than the liquidus temperature of the alloy to be used.

It has also been found that the alloy for the seal can be formed during the actual sealing operation. For example, thin washers of silver-manganese alloy along with thin washers of copper were placed into the joint between the metal and ceramic and the assembly heated whereupon the metal sheets alloyed together causing wetting and bonding to both the metal and the ceramic. The metal shims or washers are provided in the proportions previously discussed so that the resulting alloy has the preferred composition range.

The actual sealing operation must be carried out in a non-oxidizing atmosphere. It has been found that a super-dry hydrogen atmosphere is excellent for protecting the assembly during the sealing operation. Although the atmosphere must be super dry, that is with a dew point below about −60°F, this can be accomplished using low cost furnaces which permit the use of continuous (as contrasted by batch-type) operation.

The ceramic and the metal to which it is to be sealed must both be clean and free from foreign materials which might interfere with formation of the seal. The metal may be cleaned by solvent degreasing followed by acid etching and firing in hydrogen to outgas the metal. The ceramic is preferably ultrasonically cleaned in a water plus detergent solution, rinsed in deionized water, and fired in an oxidizing atmosphere to a temperature of at least 800°C to remove any organic residues.

To effect the seal, the assembly of ceramic, alloy materials, and metal to be sealed to the ceramic are placed in the non-oxidizing atmosphere and heated to a temperature of at least about 780°C and preferably to at least about 820°C. At this temperature, the alloy containing the preferred ratios of materials will flow and form a seal between the metal and the ceramic.

This operating range may be extended to higher temperatures. However, when joining silver-plated metallic members to ceramic, it is necessary to keep the sealing temperature below 960°C (the melting point of silver) to prevent melting of the silver plating.

While certain specific embodiments of the invention have been illustrated, it is intended that the invention be limited only by the appended claims.

What is claimed is:

1. A method of making a ceramic-to-metal gas-tight seal comprising placing silver, manganese, and copper metals or alloys of said metals between said ceramic and said metal and heating said materials in a non-oxidizing atmosphere to melt said silver, manganese, and copper to form an alloy between said ceramic and said metal, and cooling said materials to seal said metal to said ceramic.

2. The method of claim 1 where said alloy forming metals comprise shims which are placed between the surfaces of said ceramic and said metal to be sealed together.

3. The method of claim 2 wherein said shims comprise a silver-manganese washer and a copper washer.

* * * * *